No. 897,799. PATENTED SEPT. 1, 1908.
W. F. STEELE.
COMBINED PRODUCER GAS AND CARBURETING SYSTEM.
APPLICATION FILED MAY 25, 1906.

Witnesses:
Samuel U. Wallace
Ort Nathan

Inventor:
W. F. Steele,
By Jas S Birk
Atty.

UNITED STATES PATENT OFFICE.

WILBUR F. STEELE, OF NEW YORK, N. Y.

COMBINED PRODUCER-GAS AND CARBURETING SYSTEM.

No. 897,799. Specification of Letters Patent. Patented Sept. 1, 1908.

Application filed May 25, 1906. Serial No. 318,726.

*To all whom it may concern:*

Be it known that I, WILBUR F. STEELE, citizen of the United States, residing at New York, in the county of New York and State of New York, have invented certain new and useful Improvements in a Combined Producer-Gas and Carbureting System, of which the following is a specification.

My invention is an apparatus for the manufacture of gas, the same having particular reference, in one embodiment of said invention, to an apparatus wherein coal and a hydrocarbon, as well as alcohol or crude oil, may be used in manufacturing fuel or producer gas.

My object is to provide an apparatus whereby producer gas is enriched so as to make it available for many uses to which it cannot now be applied. It is well known that producer gas is not rich enough to produce a high heat, whereas the gas known as carbureted gas is high in heat units, comparatively.

As producer gas made from coal is ordinarily much cheaper than gas produced from hydrocarbon oils, and as such gas producing agent (coal) is not subject to inordinate and arbitrary fluctuations in price, I have devised an apparatus whereby I am enabled to combine a gas producer with means for carbureting such producer gas. In order to still further cheapen the production of gas, I provide means for using either crude oil or alcohol in addition to the light hydrocarbon oil used in carbureters, since the oil or the alcohol can be obtained at a price which will justify its use in the manufacture of the new gas.

My system also provides means for using a hydrocarbon, such as crude oil, or alcohol, with a producer gas plant, without the employment of a system for carbureting the producer gas subsequent to its production; but, under some circumstances, I find that it is more desirable to employ the two systems conjointly.

In the accompanying drawings I have shown one embodiment of the invention, but the construction shown therein is to be understood as illustrative only, and not as defining the limits of the invention.

Figure 1:
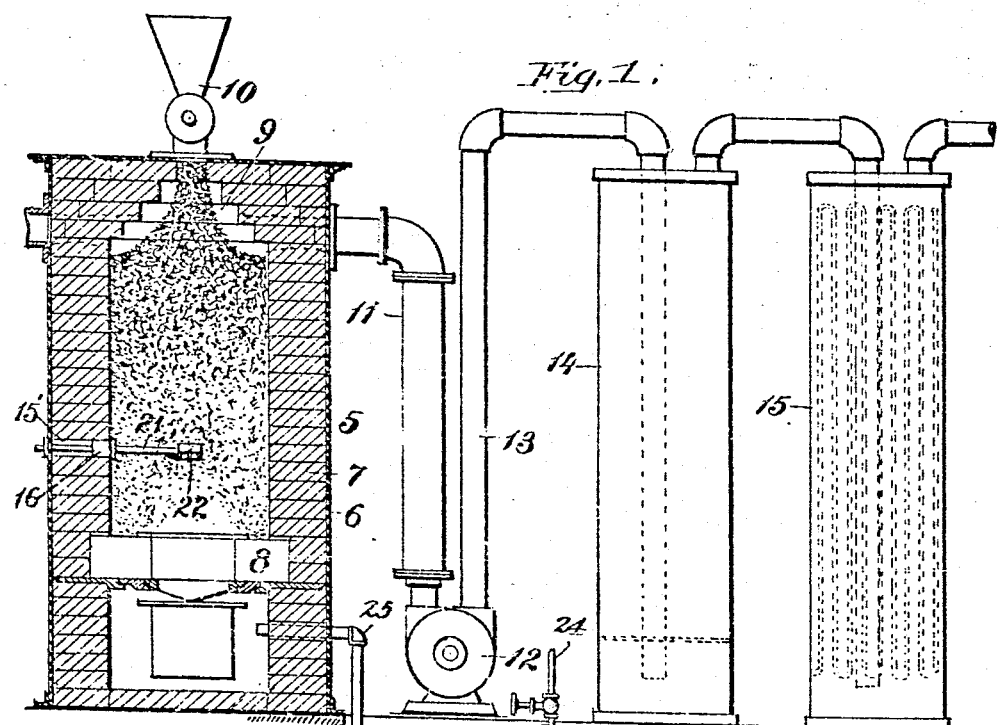
Figure 2:
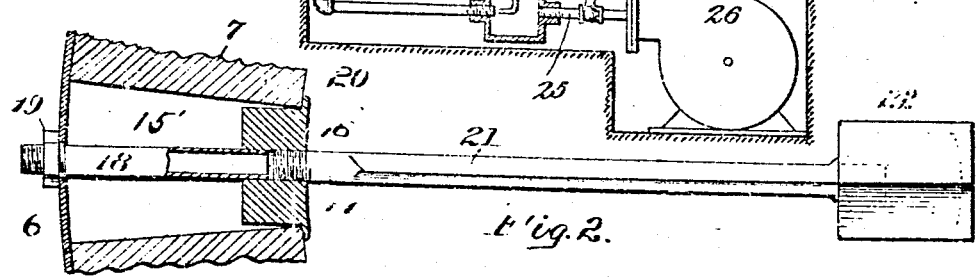
Figure 3:
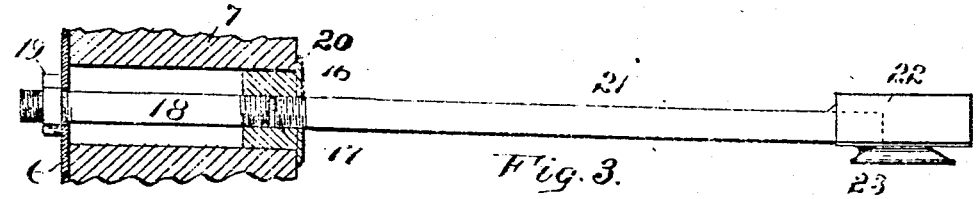
Figure 4:

Figure 1 is a side elevation, partly in section, of a producer gas plant and a carbureting system adapted for conjoint operation, as contemplated by one practical embodiment of this invention; Fig. 2 is a plan view, partly in section, of a distributer adapted to spread crude oil or alcohol within a bed of incandescent fuel within the gas producer; Fig. 3 is a view in side elevation of the distributer; and Fig. 4 is a view in end elevation of said distributer.

In one practical embodiment of the invention, a gas producer 5 is employed. Such producer is similar to ordinary structures known to the art, and, as shown, it comprises a metal shell 6, a fire brick lining 7, grate bars 8, a fuel feed opening 9 at the top of the producer, and a suitable hopper 10, for feeding coal to the chamber of said producer. As shown, the producer has an outlet pipe 11, leading from its upper part, said outlet pipe being shown as connected with an exhaust fan 12. From this fan leads a pipe 13, adapted to convey the producer gas to a suitable form of carbureter 14, and from said carbureter the gas is shown as being conveyed to a mixing chamber, one of which is indicated at 15. It will be evident that any desired number of carbureters 14, or of mixing chambers 15, may be employed in my carbureting system, as is fully set forth in my application, Serial No. 204,968, filed April 26, 1904. For the purpose of feeding crude oil into the chamber of the gas producer 5, I employ a pipe, tube or conduit 21, the same being adapted to extend from a wall of the producer interiorly thereof, whereby I am enabled to deliver crude oil, alcohol, or equivalent gas producing agent into direct and intimate contact with a bed of incandescent fuel, adapted to be maintained in any usual or ordinary manner within the aforesaid chamber of the gas producer.

In one side of the producer 5, an opening is made therein by removing one or any desired number of bricks at a point above the grate bars 8, thereby producing an opening 15'. A metal plug 16 is inserted in the inner part of said opening, said plug being shown as having a transverse female threaded aperture 17. The inlet or feed pipe 21 is provided with an external or male thread at one end, and said threaded end of the pipe is screwed into the aperture 17 of the aforesaid plug, whereby the feed pipe is supported in a substantially horizontal position, and interiorly of the chamber within the gas producer 5.

For the purpose of conducting the crude petroleum, alcohol, or other agent to the feed pipe 21, I resort, in one form of my apparatus, to the construction shown by Figs. 2 and 3 of the drawings. An opening is made in the metallic shell 6, which opening is in alinement with the opening 17, of the plug 16. A nipple 18 is arranged within the opening 15', said nipple having male threads at its respective ends. One threaded end portion of the nipple is screwed into the tapped hole 17 of the plug, whereby the nipple is adapted to convey the petroleum to the feed pipe 21. The other end of the nipple protrudes beyond the metallic shell, and said nipple is held in place by a jam nut 19. It is evident that the nipple 18 affords convenient means for connecting a suitable supply pipe, which may lead from a tank or any other source of supply for the crude petroleum or alcohol.

It is evident that the described construction holds the plug 16 firmly in position in the opening of the producer, and this plug affords a convenient means for supporting the feed pipe within the chamber of said producer.

The feed pipe 21 discharges the crude petroleum, in a liquid condition, directly within an incandescent bed of fuel adapted to be maintained in the producer. In one practical form of the invention, however, I employ means for distributing the petroleum or similar liquid gas producing agent within said bed of fuel, such distributing means also partially inclosing the delivery end of the feed pipe, for the purpose of preventing the solid material of the incandescent bed of fuel from entering said delivery end of the feed pipe and choking the same. As shown by Figs. 2, 3 and 4, the combined hood and distributer consists of members 22, 23, which may be cast in a single piece, or in separate pieces. The casting should be provided with an opening for the reception of the delivery end of the feed pipe 21, and as represented by Fig. 4, the member 23 is substantially below the open end of the pipe 21, whereas the member 22 hoods or overhangs said pipe, and the aforesaid member 23. The member 22 is roof-shaped, for the purpose of forming a guard to prevent the coal from entering and choking the end of the pipe 21. The other member 23 is inclined so as to slope in all directions, and as said member 23 is below the end of the pipe 21, the crude petroleum or alcohol is adapted to be distributed thereby uniformly within the bed of incandescent material. It will be noted, also, that the member 23 is smaller, diametrically, than the hood or member 22, and said member 22 thus serves as a guard for the distributer 23, as well as for the end of the pipe 21. As shown, the distributer and hood are placed centrally within the chamber of the producer 5, said parts and the pipe 21 being sufficiently above the zone of greatest heat, whereby the metallic parts will not deteriorate under the action of said heat. By casting the distributer and hood in a single piece, the element can be removed when burned out or destroyed, thus permitting a new element to be readily installed. It is preferred to provide the pipe 21 with a ridge or apex along its upper side so that said pipe, as well as the roof-shaped member 22, will afford as little obstruction as possible to the downward movement of the coal within the chamber of the producer. I do not desire, however, to confine myself to the particular structure, formation, and arrangement of the distributer and the hood, nor, as a matter of fact, is my invention limited to the employment of this element, for the reason that the element may be wholly omitted, or other forms of distributers may be employed, without departing from the spirit of the invention.

For the purpose of supplying air to the producer in order to heat or "blow up" the bed of fuel to incandescence, I may employ the usual mechanical expedient of an air pipe 25 and a fan or blower 26; to supply steam to the producer for bringing it into contact with the incandescent bed and thus producing water gas, I employ a steam pipe 24. The steam and air pipes 24, 25, may be combined as shown by Fig. 1, for the purpose of feeding steam and air into the producer simultaneously, and, in this event, the steam supply operates to draw in the air constantly, although the volume of air admitted may be varied and regulated by an ordinary form of valve in an obvious manner.

The operation is as follows:—In the apparatus shown by the drawings, it is intended that the bed of fuel shall be heated to incandescence, and that steam be supplied to, and in contact with, said bed of incandescent fuel, for the purpose of producing water gas. Oil, or other gas producing agent, is conducted gradually through the feed pipe 21 into the incandescent fuel within the producer, at which point the oil or alcohol becomes thoroughly gasified by contact with said bed of fuel, the gas thus produced being generated in the producer in the usual manner of gas making. In the drawings I have represented one means for combining steam with gas evolved from the decomposition of petroleum or alcohol, but it will be understood that it is not essential in this invention to decompose steam for the production of water gas, for the reason that this apparatus enables me to produce a commercial gas from crude petroleum alone. The gases made from oil are, as is well known, very much higher in heat units per cubic foot than the producer or water gas, but by combining water gas with the gas from petroleum, or alcohol, I am enabled to produce a gas which is much richer in heat units.

In the apparatus shown by the drawings, the gas is adapted to be drawn from the producer through the pipe 11, by the operation of the exhaust fan 12, and said gases are conducted by the pipe 13, into the scrubber 14, at which point the gases are carbureted or enriched. For this purpose, I may employ any well known type of carbureter.

It will be understood that my apparatus or system for producing gas comprises means for making and mixing oil and water gas, in conjunction with means for subsequently carbureting or enriching the gas. This enables me to cheapen the cost, and at the same time, produce a gas having high units, thus producing a gas made from a high quality of oil, so that it can be used for many purposes requiring high calorific powers.

I contemplate the employment of means for introducing crude oil or alcohol into the producer for the purpose of enriching the water or producer gas, but should the character of the crude oil be such that the gas is not sufficiently enriched, then I may employ, also, the carbureter 14; and to still further improve the quality of the gas, I may subject it to treatment in the heating or mixing chambers 15, whereby my apparatus enables me to economically produce a most efficient gas. It should be understood, further, that the combined water and oil gas, or the oil gas alone, produced in the gas producer may be utilized for commerical and other purposes when taken directly from said producer, that is, I may dispense with the step of enriching the gas in the carbureter 14, and omit the step of treating the gas in the heating and mixing chamber 15.

Having thus described my invention, what I claim is:—

1. In a gas producer, a fuel chamber adapted to contain a bed of incandescent fuel, means for introducing air into said chamber whereby the fuel may be kept in an incandescent state, and means located within said fuel chamber and adapted to be surrounded by the incandescent fuel therein for introducing liquid fuel within the body of incandescent fuel, whereby within a single producer or chamber said liquid fuel is vaporized, gasified, and mixed with the gases produced from said incandescent fuel and air, thereby resulting in a fixed gas of high combustible power.

2. In a gas producer, a fuel chamber adapted to contain a bed of incandescent fuel, means for introducing air into said chamber whereby the fuel may be kept in an incandescent state, means for introducing steam into said chamber, and means located within said fuel chamber and adapted to be surrounded by the incandescent fuel therein for introducing liquid fuel within the body of incandescent fuel, whereby within a single producer or chamber said liquid fuel is vaporized, gasified, and mixed with the gases produced from said incandescent fuel and air, thereby resulting in a fixed gas of high combustible power.

3. In a gas producer, a fuel chamber adapted to contain a bed of incandescent fuel, means for introducing air into said chamber whereby the fuel may be kept in an incandescent state, means for introducing steam into said chamber, and means located within and substantially centrally of said fuel chamber for feeding oil directly to the incandescent fuel therein.

4. In a gas producer, a grate for supporting a bed of incandescent fuel and means, located in close proximity to said grate and adapted to be inclosed within the bed of incandescent fuel, for introducing liquid fuel within said bed of incandescent fuel.

5. In an apparatus of the class described, a gas producer having a liquid fuel supply means extending into the area to be occupied by a bed of incandescent fuel, and a distributer adapted to substantially inclose the delivery portion of the said supply means.

6. In an apparatus of the class described, a gas producer, a liquid fuel pipe extending into the chamber of said producer, and a distributer substantially inclosing the delivery portion of said pipe.

7. In a gas producer, a fuel chamber adapted to contain carbonaceous fuel, means for introducing air into said chamber for primarily promoting combustion of said carbonaceous fuel, and means located within the fuel chamber and adapted to be enveloped by said carbonaceous fuel therein for introducing a liquid fuel within the mass of carbonaceous fuel, whereby within a single producer or chamber said liquid fuel is decomposed, gasified and mixed with the gases produced from said carbonaceous fuel and air.

8. In a gas producer, a fuel chamber adapted to contain carbonaceous fuel, means for introducing air into said chamber for primarily promoting combustion of said carbonaceous fuel, means for introducing steam into said carbonaceous fuel, and means located within the fuel chamber and adapted to be enveloped by said carbonaceous fuel therein for introducing liquid fuel within said mass of carbonaceous fuel, whereby within a single producer or chamber said steam and liquid fuel are decomposed, gasified and mixed with each other and with the gases produced from said carbonaceous fuel and air.

In testimony whereof I affix my signature in presence of two witnesses.

WILBUR F. STEELE.

Witnesses:
J. S. ZERBA,
J. D. WHEELER.